United States Patent [19]

Barthomeuf et al.

[11] Patent Number: 5,068,483

[45] Date of Patent: Nov. 26, 1991

[54] CATALYSTS BASED ON ZEOLITES MODIFIED BY ALKALI METAL ELEMENTS IN THE METALLIC FORM, THEIR PREPARATION, AND THEIR APPLICATION TO ALKYLATION OF ALKYLAROMATIC DERIVATIVES

[75] Inventors: Denise Barthomeuf; Viviane Q. de Quivillic, both of Paris, France

[73] Assignees: Centre National de la Recherche Scientifique; Societe Nationale Elf Aquitaine, both of Paris, France

[21] Appl. No.: 460,124

[22] PCT Filed: Nov. 23, 1988

[86] PCT No.: PCT/FR88/00572

§ 371 Date: Jul. 12, 1990

§ 102(e) Date: Jul. 12, 1990

[87] PCT Pub. No.: WO89/04716

PCT Pub. Date: Jun. 1, 1989

[30] Foreign Application Priority Data

Nov. 23, 1987 [FR] France ................................. 87 16191

[51] Int. Cl.$^5$ ........................... C07C 2/68; B01J 29/04
[52] U.S. Cl. ................................... 585/467; 585/446; 502/60; 502/61; 502/79
[58] Field of Search ................... 585/467, 446; 502/60, 502/61, 79

[56] References Cited

U.S. PATENT DOCUMENTS

| 2,882,244 | 4/1959 | Milton | 423/328 C |
| 3,013,987 | 12/1961 | Castor et al. | 423/328 C |
| 4,483,937 | 11/1984 | Liu | 502/79 |
| 4,689,316 | 8/1987 | Bowman | 502/243 |
| 4,916,100 | 4/1990 | Knuuttila et al. | 585/467 |

FOREIGN PATENT DOCUMENTS

| 0161727 | 3/1986 | European Pat. Off. |
| 3606706 | 9/1986 | Fed. Rep. of Germany |
| 1177169 | 1/1970 | United Kingdom |

OTHER PUBLICATIONS

Barrer, R. M. *Hydrothermal Chemistry of Zeolites*, Academic Press: New York, 1982, pp. 252-253.

*Primary Examiner*—Anthony McFarlane
*Assistant Examiner*—Nhat Phan
*Attorney, Agent, or Firm*—Oliff & Berridge

[57] ABSTRACT

Novel catalysts based on X zeolites which contain alkali metal cations other than sodium and modified by inclusion, as additives, of alkali metal elements in the metallic form. These novel catalysts have increased catalytic activity and stability over time in comparison with zeolites in which no alkali metal has been included.

14 Claims, No Drawings

CATALYSTS BASED ON ZEOLITES MODIFIED BY ALKALI METAL ELEMENTS IN THE METALLIC FORM, THEIR PREPARATION, AND THEIR APPLICATION TO ALKYLATION OF ALKYLAROMATIC DERIVATIVES The subject of the present invention is novel catalysts based on zeolites modified with the aid of additives composed of alkali metal elements in the metallic form, their preparation, and their application to alkylation of alkylaromatic derivatives.

BACKGROUND OF THE INVENTION

It is known that alkylation of the side chain of alkylaromatic derivatives is a useful method for preparing styrene and similar derivatives such as p-vinyltoluene or p-t-butylstyrene. Such alkylation reactions of toluene, xylenes, or p-t-butyltoluene by methanol, formaldehyde, or methylal (dimethyl acetal of formaldehyde), using catalysts based on zeolites exchanged by various alkali metal cations and/or doped with boron or phosphorus have already been described; see for example U.S. Pat. Nos. 4,115,424, 4,140,726, 4,463,204, and 4,483,936; the articles by C. Lacroix et al., *Journal de Chimie Physique*, 1984, 81, pages 473–490; German Patent Application 3,316,929; and the article by J. M. Garces et al., "Catalysis by Acids and Bases," Imelik et al. Ed., *Ser. Studies in Surface Sciences and Catalysis*, 20, 67–74 (1985), Elsevier Science Publishers B. V., Amsterdam.

The best-studied reaction is the toluene alkylation reaction which generally yields mixtures of styrene, ethylbenzene, and decomposition products of the alkylation agent, and possibly various products from alkylation of the aromatic ring. To direct the selectivity of the reaction to formation of styrene and ethylbenzene, the use of X zeolites modified by exchange of sodium cations by lithium, potassium, rubidium, and/or cesium cations has been recommended. X zeolites exchanged by cesium have proved to be the most useful.

It is known that zeolites of the faujasite type have a highly organized crystal structure, whereby the basic element is a three dimensional lattice composed of a regular arrangement of $SiO_4$ and $AlO_4^-$ tetrahedra connected together by oxygen vertices. The arrangement of the tetrahedra in space forms polyhedra that delimit a network of channels, cages, and cavities in which the alkali metal cations are located at points where they balance the negative charges supplied by the $AlO_4^-$ tetrahedra.

A lattice with a faujasite structure has 192 $SiO_4$ or $AlO_4^-$ tetrahedra and its general formula may be written:

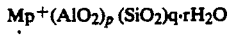
$$M_p^+(AlO_2)_p (SiO_2)_q \cdot rH_2O$$

wherein

M is an alkali metal, and p and q are whole numbers such that $p+q=192$, r is zero or a whole number less than 270, depending on the degree of hydration.

In X zeolites, the ratio $q/p$ (Si/Al) is less than 1.5 and generally between 1 and 1.5.

The X zeolites may be prepared for example by the method described in U.S. Pat. Nos. 2,882,244 and 3,251,897.

Gallosilicates with a faujasite structure that have a formula similar to the foregoing may be prepared in a similar manner by replacing Al by Ga (reference: R. M. Barrer, "Hydrothermal Chemistry of Zeolites," Acad. Press, Lond, 1982, pp. 282s). In the description below, the general reference to zeolites by convention encompasses both aluminosilicates and gallosilicates.

These zeolites are present in the form of powders.

In zeolites, the metal ions (generally sodium ions) can be exchanged with other alkali metal ions in certain proportions by being placed in contact with a salt or hydroxide solution of these alkali metal ions; see for example the prior art cited in the introduction, or the following references: Sidorenko et al., *Dokl. Akad. Nauk SSSR*, 173, 132 (1967); Yashima et al., *J. Catal.*, 26, 303 (1972); Itoh et al., *J. Catal.*, 72, 170 (1981); H. Sherry *J. Phys. Chem.*, 70, 1158 (1966); H. Sherry, "Molecular Sieves Zeolites," I., Flanigen et al., Ed., A.C.S. Series, 101, 350 (1971).

It is also known that a number of authors have introduced metallic sodium into zeolites with sodium cations, for example by causing them to contact sodium vapors, or by mixing with sodium azide followed by heat treatment whereby the ozide decomposes; see in particular J. A. Rabo et al., *Discuss. Faraday Soc.*, 41, 323 (1966); and L. R. M. Martens et al., "Preparation of Catalysts IV," B. Delmon et al., Ed., pages 531–541, Elsevier Science Publishers B.V., Amsterdam (1987). The latter authors used modified zeolites obtained, in butene isomerization reactions at room temperature.

SUMMARY OF THE INVENTION

The subject of the present invention is novel catalysts based on X zeolites which, on the one hand, contain alkali metal cations other than sodium and, on the other hand, are modified by inclusion, as additives, of alkali metal elements in the metallic form. These novel catalysts have increased catalytic activity and stability over time by comparison with corresponding zeolites in which no alkali metal has been included.

Surprisingly, it has been discovered that these novel catalysts have a different mode of action than that of the modified zeolites used hitherto in alkylation reactions of alkylaromatic derivatives. This different mode of action arises in particular from the fact that the activity of the catalyst generally increases with reaction time, for several hours, while the reverse phenomenon was observed with catalysts based on known modified zeolites. Such an improvement in catalytic activity is all the more surprising in that, in the experience of the Applicant, zeolites with a sodium cation doped with metallic sodium, which are known, have only very low catalytic activity in the toluene alkylation reaction.

DESCRIPTION OF THE PREFERRED EMBODIMENTS

Hence, the present invention has as its subject alkaline aluminosilicate or gallosilicate catalysts with a faujasite structure, having an Si/Al or Si/Ga ratio of less than 1.5, wherein at least 10% of the alkali metal cations are potassium, rubidium, and/or cesium ions, characterized by containing, as an additive, inclusions of at least one alkali metal element in the metallic form.

DETAILED DESCRIPTION OF THE INVENTION

In the catalysts or the invention, the Si/Al or Si/Ga ratio is generally greater than or equal to 1.

The potassium, rubidium, and/or cesium ions may represent in particular at least 20%, and especially at least 30% of the alkali metal cations.

When the zeolites with potassium, rubidium, or cesium ions are prepared directly, these ions represent the totality of alkali metal ions. When these zeolites are prepared by ion exchange, the maximum content of potassium, rubidium, and/or cesium ions depends on the maximum exchange capacity of the starting zeolite with the ion in question. These exchange capacities are known. For example, starting with a zeolite with sodium ions, the sodium may be totally exchanged by potassium ions, but only about 75%, at most, of sodium ions can be replaced by rubidium or cesium ions.

In the modified zeolites of the invention, the alkali metal ions other than potassium, rubidium, and/or cesium are sodium and/or lithium ions. Generally, the lithium ions, when present, represent at most 2% of the total weight of the catalyst.

The alkali metal elements included in the metallic form added as additives may be lithium, sodium, potassium, rubidium, cesium, and/or their mixtures. These alkali metal elements are added in a sufficient proportion to obtain the improvement in the catalytic effect. These proportions may be easily determined by simple routine experiments In general, the alkali metal additive content of the catalyst may range from 0.1 to 15 wt. % with respect to the total weight of the catalyst, in particular from 0.1 to 10% and more particularly from 0.3 to 10%.

The catalysts according to the invention may also contain doping agents, for example usual doping agents containing boron, phosphorus, copper, silver, manganese, iron, zinc, etc. In general, the doping agent is present in the catalyst at a concentration as high as 3 wt. %.

The invention also has as its subject a method for preparing the catalysts as defined above.

This method is characterized in that an aluminosilicate or gallosilicate with a faujasite structure, having an Si/Al or Si/Ga ratio of less than 1.5, in which at least 10% of the alkali metal cations are potassium, rubidium, and/or cesium ions, is subjected to the action of a reagent chosen from the vapors of alkali metals and the alkali metal derivatives capable of decomposing to give the corresponding alkali metal.

The reaction with the alkali metal vapors may be conducted according to the methods described in particular by Rabo et al., op. cit., and by M. R. Harrison et al., *Journal of Solid State Chemistry*, 54, 330–341 (1984).

The reaction is generally conducted at reduced pressure, at a temperature higher than the boiling point of the alkali metal.

The alkali metal derivatives added may be incorporated in any appropriate form. For example, they may be incorporated in the form of powders, by mechanical mixing, or in the form of solutions or suspensions in an appropriate liquid, by impregnation. The liquid is then eliminated by evaporation.

Among the additives capable of decomposing to give inclusions of alkali metal in zeolites, one may mention in particular alkali metal azides such as sodium and cesium azides, or alkali metal amides. The additives may be incorporated into zeolites either by mechanical mixing or by impregnating the zeolites with a solution of the additive. Azide solutions in acetone or methanol, or aqueous solutions, may in particular be used. It is preferable to employ quantities exactly sufficient to impregnate the zeolite homogeneously. The solvent is then eliminated by evaporation.

The other doping agents that may be present are introduced according to the usual methods, either before or after introduction of the alkali metal element.

For example, to introduce boron, the method described by C. Lacroix et al (op. cit.) consisting of impregnating the zeolite with a boric acid solution in acetone may be used.

The final stage of preparation of the catalyst generally involves heat treatment. Of course, this heat treatment is conducted at a temperature at least equal to the decomposition temperature of the additive alkali metal derivative, if present. The heat is preferably brought to a temperature higher than the utilization temperature of the catalyst, particularly when the catalyst is to be used immediately. The temperature is brought for example to at least 450° C., in particular to about 500° C. This heat treatment may be conducted in stages. For example, the temperature may first be brought to above 100° C. and lower than 150° C., and may be kept steady at the chosen temperature (elimination of water and possibly of solvents). Heating is then continued, for example to 500° C., to decompose any alkali metal derivative used as an additive and eliminate the various impurities. This heat treatment may be conducted in an inert atmosphere, or even in an oxygen atmosphere. The catalyst is then slowly cooled to room temperature or, where appropriate, to the utilization temperature.

The invention also has as its subject the use of zeolites modified by an alkali metal, as defined above, as catalysts in alkylation reactions of alkylaromatic derivatives. Such reactions are known of themselves, and are described in particular in the prior art references cited in the introduction.

The invention has as its particular subject a method for alkylating alkylaromatic derivatives, in particular alkylaromatic derivatives with the formula:

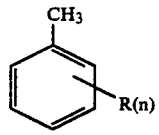

wherein R represents a lower alkyl group having for example 1 to 4 and in particular 1 to 3 carbon atoms, and n is a whole number equal to 0, 1, or 2, representing the number of R substituents present in the molecule. In the case where several R substituents are present, they may be identical or different. R represents in particular a methyl, ethyl, or isopropyl group.

This alkylation method, with the aid of a reagent chosen from methanol, formaldehyde, and methylal, is characterized by the reaction being conducted in the presence of a catalyst based on the zeolite modified by addition of alkali metal as defined above. The use of such modified zeolites favors the orientation of the alkylation reaction to formation of compounds with a formula:

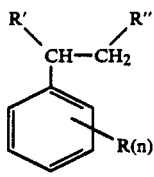

wherein R' and R" each represent —H or together represent a second bond between the —CH and —CH$_2$ groups to which they are respectively attached.

The alkylation is generally conducted at a temperature that can range from 300° to 500° C. The appropriate reaction temperatures may be determined in each case by simple routine experiments. The starting reagents are mixed in the gaseous form and the gas mixture, which may be entrained by a carrier gas, passes into a reactor containing the catalyst. The carrier gas is, for example, hydrogen or an inert gas such as nitrogen.

Such alkylation reactions are known of themselves.

In the case of alkylation of toluene by methanol or another similar reagent, the catalysts of the invention allow the reaction to be directed toward selective, or preponderant, formation of ethylbenzene and styrene according to a reaction of the following type:

$$2C_6H_5-CH_3+2CH_3OH \rightarrow C_6H_5-C_2H_5+C_6H_5-CH=CH_2+2H_2O+H_2$$

The following examples illustrate the invention without however limiting it:

EXAMPLE 1

Preparation of an X zeolite exchanged by cesium ions, with introduction of sodium in the azide form a) Exchange with cesium hydroxide.

The starting product is an NaX zeolite sold by Union Carbide as 13X, and which has the following formula:

$$Na_{86}(AlO_2)_{86}(SiO_2)_{106} \cdot rH_2O.$$

Nine grams of this zeolite is mixed with 75 cc of a 0.43 M solution of cesium hydroxide at a temperature of 90° C. The mixture is agitated for 5 hours.

The solid product is separated by centrifugation. The catalyst is then dried at 80° C. for 1 hour. A second exchange is conducted with 100 cc of a 0.43 M solution of cesium hydroxide for 17 hours at 90° C. After centrifugation, the catalyst is dried at 80° C. for 48 hours.

b) Incorporation of sodium azide by mechanical mixing

Twenty-five mg of the product obtained from stage a) is heated in a 350° C. oven for 4 hours. After cooling, 2.6 mg of sodium azide is added and the two powders are mixed without destroying the catalyst grains.

The mixture is then heat-treated under a stream of nitrogen or oxygen according to the following program:
temperature rise (100° C./h) to 130° C.;
this temperature kept steady for 1 hour;
temperature rise to 500° C. (250° C./h) and kept steady for 5 hours at this temperature;
slow cooling (30° C./h) to room temperature (or utilization temperature).

The catalyst obtained will hereinafter be called CsXNa(1).

EXAMPLE 2

X zeolite exchanged with cesium, with introduction of sodium in the azide form in solution in acetone The cesium-exchange zeolite is prepared as in example 1 (1.85 g). The product is dried overnight at 350° C. The solid is then agitated in 20 cc of highly pure acetone containing 0.185 g of sodium azide, for 2 hours at room temperature. The acetone is then evaporated at 60° C. The catalyst is dried at 80° C. for 24 hours. It is then subjected to the same heat treatment as the catalyst in Example 1.

The catalyst obtained will hereinafter be called CsXNa(2).

EXAMPLE 3

X zeolite exchanged with cesium, doped with boron and metallic sodium by introduction of sodium azide a) X zeolite exchanged with cesium and doped with boron.

An X zeolite exchanged with cesium is prepared as in Example 1. Two grams of the product is dried at 90° C. overnight. The solid is then agitated for 2 hours at room temperature in 30 ml of a solution of 93 mg boric acid in acetone. The acetone is then allowed to evaporate. It is dried for 1 hour at 100° C., then for 60 hours at 150° C.

It has been observed that the boron-doped catalyst thus obtained, after heat treatment in a nitrogen atmosphere as in Example 2, reaches its maximum catalytic activity in the toluene alkylation reaction only after 2 to 3 weeks.

The catalyst obtained has thus been doped with metallic sodium after 3 weeks' storage.

b) The catalyst prepared in stage a), stored for 3 weeks, is heated at 350° C. for 12 hours.

After cooling, 25 mg of the product is mixed with 2.6 mg of sodium azide in the solid form. After mixing, to obtain a homogeneous composition, it is heated to 300° C. in a nitrogen atmosphere as described in Example 1.

The catalyst obtained will hereinafter be called CsXBNa(3).

EXAMPLE 4

X zeolite exchanged with cesium doped with metallic sodium by sodium vapors

An X zeolite exchanged with cesium is prepared as in Example 1. 25 mg of the product is dried at at a temperature of 300° C. under an oxygen stream for 5 hours, then under a nitrogen stream for 5 minutes. After return to room temperature, a small piece of sodium, pre-rinsed with toluene and dried, is placed in the bottom of the reactor under a nitrogen atmosphere. The reactor is connected to a vane pump and the temperature is progressively raised to 480° C. and held at this temperature for 3 hours; then the reactor is allowed to cool.

EXAMPLE 5

Study of alkylation of toluene by methanol

Prolabo toluene (HPLC grade) containing less than 0.03% water is used.

The methanol (from BDH Chemical Ltd.) contains 0.1% water; it is dried over a 3A molecular sieve before utilization.

The apparatus used allows either the mixture of reagents or the pre-treatment gas to be circulated in the reactor.

The pre-treatment gas (nitrogen or oxygen) is selected using a four-way valve V1. Its circulation in the reactor is controlled by a second valve V2. Its flowrate is measured with a bubble flowmeter and adjusted by a needle valve. The methanol is supplied by a saturator-condenser system; the temperature of the condenser is kept constant by means of a cryostat. The carrier gas flow, the flowrate of which is controlled by a needle valve, first circulates through the saturator-condenser.

It is then mixed with the toluene injected by means of a hypodermic syringe. The mixture of reagents is homogenized by passing through an ampule filled with glass beads, placed in an enclosure heated to 130° C. Four-way valve V2 allows the reagents to circulate to the reactor.

The catalyst (25 mg) is placed in a thin bed on sintered glass in the microreactor, which is of the differential type. The reactor is placed in an oven whose temperature is adjusted to within 0.1° C. by means of a programmed controller. Valve V2 allows the reactor to be flushed with either pre-treatment gas or the reaction mixture.

At the exit from the reactor, a valve V3 allows the reaction products to be sent to a gas chromatograph for analysis. The latter is fitted with a pneumatically controlled heating automatic injection valve. The samples are taken at regular intervals. The valve simultaneously controls the peak integrator. The products are separated at 110° C. on a Chromosorb column (grain size =60-80 mesh or 20-250 microns) containing 5% didodecyl phthalate and 5% bentone 34 (column length =6 meters). The column head pressure is 2.7 bars. Detection is by flame ionization. The detector temperature is 200° C.

Under the experimental conditions described, the retention times obtained are as follows (in seconds): dimethyl ether: 130; methanol: 199; benzene: 266; toluene: 382; ethylbenzene: 577; p-xylene: 618; m-xylene: 668; o-xylene: 741; styrene: 942.

Of course, the intervals between two gas flow injections are selected on the basis of these retention times.

Each test is conducted as follows:

1) 25 mg of catalyst is placed in the reactor and treated under a nitrogen or oxygen stream (3 l/h) according to the following program:
temperature rise 100° C./h from 25° C. to 130° C.;
this temperature maintained at 130° C. for 1 hour;
temperature rise (250° C./hour) from 130 to 500° C.;
temperature maintained at 500° C. for 5 hours;
temperature lowered (30° C./hour) from 500° C. to 425° C. (utilization temperature).

2) The mixture of toluene and methanol entrained by the carrier gas (hydrogen) is analyzed by gas chromatography until the desired proportions of reagents are obtained and remain stable.

3) The reaction mixture is then introduced into the reactor by valve V2 and analyzed at the exit by chromatography at regular intervals for 3 to 24 hours.

To express the results of the catalytic test, several values may be used. The experimental conditions are such that one of the reagents, toluene, is in excess with respect to the other, methanol. Thus, the conversion rate of methanol (Tm) in % is defined as:

$$Tm: \frac{\text{number of moles of methanol converted}}{\text{number of moles of initial methanol}} \times 100$$

The percentage formation of a product p (Fp) is defined as follows:

$$Fp: \frac{\text{number of moles of } p \text{ formed}}{\text{number of moles of initial methanol}} \times 100$$

In particular, Fst designates the percentage formation of styrene and Feb designates the percentage formation of ethylbenzene.

The styrene and ethylbenzene selectivity (S) is also defined with respect to the converted methanol:

$$S: \frac{Fst + Feb}{Tm} \times 100$$

The values Tm, Fp, and S are instant values, measured after a given reaction time.

EXAMPLE 6

Study of catalyst of Example 1

This catalyst is studied by comparison with the catalyst simply exchanged with cesium obtained in Example 1, stage a). This comparison catalyst is designated by the abbreviation CsXOH.

Catalyst CsX-Na(1), prepared immediately before the test, underwent the final heat treatment mentioned in Example 1 in the reactor under a nitrogen atmosphere in one case and oxygen in another case. The alkylation reaction is then conducted according to the protocol described in Example 5. The results are summarized in Table 1 wherein t/m represents the ratio between the number of moles of toluene and the number of moles of methanol of the entering mixture. The carrier gas is hydrogen (flowrate 2.25 l/h).

TABLE 1

| Pretreatment | Catalyst | CxXOH | | CsX—Na(1) | |
|---|---|---|---|---|---|
| Oxygen | t/m | 9 | | 11.3 | |
| | time (h) | 6 | 15 | 6 | 15 |
| | Tm (%) | 30 | 20 | 29 | 26 |
| | Fst (%) | 2.1 | 1.1 | 3.8 | 3.1 |
| | Feb (%) | 1.5 | 0.6 | 3.4 | 2.6 |
| | S (%) | 12 | 8.5 | 24.8 | 21.9 |
| Nitrogen | t/m | 9 | | 10 | |
| | time | 6 | | 6 | 15 |
| | Tm (%) | 15 | | 45 | 40 |
| | Fst (%) | 0.7 | | 4.3 | 4 |
| | Feb (%) | 0.25 | | 4.1 | 3.8 |
| | S (%) | 6.3 | | 18.6 | 19.5 |

These results show that the selectivity of the catalyst in Example 1 is greatly increased by comparison to that of the comparison product, and that the catalytic activity remains high even after 15 hours of use.

For comparison, the catalytic activity of an X zeolite with sodium cations with sodium inclusion, obtained by mixing the 13X zeolite with sodium azide in the same proportion as in Example 1b, was studied. This mixture was subjected to the same heat treatment as in Example 1. With this catalyst, the alkylation reaction of toluene was studied as above (t/m 1.4). The percentages of Feb and Fst formation were less than 0.1%.

EXAMPLE 7

Study of catalyst in Example 2

This catalyst, CsX-Na(2) was studied by comparison to catalyst CsXOH in Example 1 a).

The catalyst was pretreated under a nitrogen stream similarly to Example 6, but the temperature was held steady at 300° C. for 1 h 30 min. This treatment was followed by heating up to the reaction temperature.

The results are summarized in Table II in which T° C. represents the reaction temperature and TR represents the reaction time in hours. In these experiments, the t/m values were 8.3.

TABLE II

| | CsXOH | | | | CsX-Na(2) | | | |
|---|---|---|---|---|---|---|---|---|
| T° C. | TR | Tm % | Fst % | Feb % | TR | Tm % | Fst % | Feb % |
| 425° C. | 1 h | 44 | 2.3 | 3.11 | 16 h | 40 | 1.1 | 1.1 |
| | 4.5 h | 41 | 1.85 | 2.6 | | | | |
| 450° C. | 5.5 h | 64 | 1.8 | 3.6 | 20 h | 63 | 2.2 | 3.6 |
| 475° C. | 7 h | 80 | 1.3 | 3.7 | 22 h | 58 | 2 | 4 |
| 490° C. | 8.5 h | 80 | 1.2 | 3.4 | 23.5 h | 70 | 1.8 | 4.5 |

At temperatures higher than 425° C., traces of orthoxylene (half the amount with catalyst CsX-Na(2) than with catalyst CsXOH) were observed.

EXAMPLE 8

Study of catalyst in Example 3

This study was performed under conditions comparable to those in Example 6.

The study compared the catalyst of Example 1 a), designated CsXOH, with the catalyst obtained in Example 3, stage a), designated CsXB.

The results are summarized in Table III in which ND signifies: not determined. The values of t/m were between 7 and 9.

TABLE III

| Catalyst | Pretreatment | Tm % after 6 h | Tm % after 15 h | Fst % after 6 h | Fst % after 15 h | Feb % after 6 h | Feb % after 15 h | S % after 6 h | S % after 15 h |
|---|---|---|---|---|---|---|---|---|---|
| CsXOH | Nitrogen | 15 | ND | 0.7 | ND | 0.25 | ND | 6.3 | ND |
| | Oxygen | 30 | 20 | 2.1 | 1.1 | 1.5 | 0.6 | 12 | 8.5 |
| CsXB | Nitrogen | 15 | 12 | 5 | 3.1 | 0.35 | 0.1 | 36 | 27 |
| CsXB—Na(3) | Nitrogen | 8.5 | 5.5 | 3.5 | 2.7 | 1.1 | 0.65 | 54 | 60 |

It can be seen that the catalyst of Example 3 allows the reaction to be directed toward formation of styrene and ethylbenzene with useful selectivity.

What is claimed is:

1. Catalysts comprising alkali metal cations and aluminosilicates or gallosilicates having a faujasite structure, which contains a Si/Al or Si/Ga molar ratio of less than 1.5 on an elemental basis, wherein at least 10% of the alkali metal cations are selected from at least one of potassium, rubidium, and cesium cations, further comprising inclusions of at least one alkali metal element in the metallic form.

2. Catalysts according to claim 1, wherein the alkali metal cations are at least one of sodium and lithium cations.

3. Catalysts according to claim 1 wherein said alkali metal element in metallic form is present in proportions that range from 0.1 to 15 wt % relative to the total weight of the catalyst.

4. Catalysts according to claim 1, further comprising a doping agent.

5. Catalysts according to claim 4, wherein said doping agent comprises boron.

6. Catalysts according to claim 1, wherein at least 20% of the alkali metal cations are selected from at least one of potassium, rubidium, and cesium cations.

7. Process for preparing a catalyst, said catalyst comprising alkali metal cations and aluminosilicates or gallosilicates having a faujasite structure which contains a Si/Al or Si/Ga molar ratio of less than 1.5 on an elemental basis, wherein at least 10% of the alkali metal cations are selected from at least one of potassium, rubidium, and cesium cations, further comprising inclusions of at least one alkali metal element in the metallic form, wherein said process comprises subjecting said aluminosilicate or said gallosilicate to the action of a reagent selected from the group consisting of vapors of alkali metals, and alkali metal derivatives capable of decomposing to give a corresponding alkali metal.

8. Process according to claim 7, wherein said alkali metal derivative is in the form of a powder and is incorporated into said aluminosilicate or said gallosilicate by mechanical mixing, or wherein said alkali metal derivative is in the form of a solution or suspension in a liquid and is incorporated into said aluminosilicate or said gallosilicate by impregnation.

9. Process according to claim 7, wherein said alkali metal derivative is selected from the group consisting of alkali metal azides and alkali metal amides.

10. Process according to claim 7, wherein said catalyst is subjected to a heat treatment step.

11. Use of a catalyst as claimed in claim 1 in alkylation reactions of alkylaromatic derivatives.

12. Process for alkylating alkylaromatic derivatives of the formula:

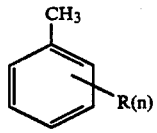

wherein R represents a lower alkyl group and n is a whole number equal to 0, 1, or 2, representing the number of R substituents present in the molecule, with an alkylating reagent selected from the group consisting of methanol, formaldehyde, and methylal, wherein the reaction is conducted in the presence of a catalyst as claimed in claim 1.

13. Process according to claim 10, wherein the heat treatment is performed at a temperature of at least 450° C.

14. Process according to claim 10, wherein the heat treatment is performed at about 500° C.

* * * * *